(12) United States Patent
Freeman et al.

(10) Patent No.: US 10,934,871 B2
(45) Date of Patent: Mar. 2, 2021

(54) SEGMENTED TURBINE SHROUD WITH SEALING FEATURES

(71) Applicants: Rolls-Royce North American Technologies, Inc., Indianapolis, IN (US); Rolls-Royce plc, London (GB); Rolls-Royce Corporation, Indianapolis, IN (US)

(72) Inventors: Ted J. Freeman, Danville, IN (US); Peter Broadhead, Derby (GB); Aaron D. Sippel, Zionsville, IN (US); David J. Thomas, Brownsburg, IN (US); Joseph P. Lamusga, Indianapolis, IN (US)

(73) Assignees: Rolls-Royce North American Technologies Inc., Indianapolis, IN (US); Rolls-Royce plc; Rolls-Royce Corporation, Indianapolis, IN (US)

( * ) Notice: Subject to any disclaimer, the term of this patent is extended or adjusted under 35 U.S.C. 154(b) by 502 days.

(21) Appl. No.: 15/049,672

(22) Filed: Feb. 22, 2016

(65) Prior Publication Data
US 2016/0245102 A1    Aug. 25, 2016

Related U.S. Application Data

(60) Provisional application No. 62/118,802, filed on Feb. 20, 2015.

(51) Int. Cl.
*F01D 11/00*    (2006.01)
*F01D 25/24*    (2006.01)

(52) U.S. Cl.
CPC .......... *F01D 11/005* (2013.01); *F01D 25/246* (2013.01); *F05D 2240/11* (2013.01); *F05D 2240/40* (2013.01); *F05D 2300/6033* (2013.01); *Y02T 50/672* (2013.01)

(58) Field of Classification Search
CPC .. F01D 11/005; F01D 25/246; F05D 2240/11; F05D 2240/40; F05D 2300/6033; Y02T 50/672
See application file for complete search history.

(56) References Cited

U.S. PATENT DOCUMENTS

| | | | |
|---|---|---|---|
| 5,593,278 A * | 1/1997 | Jourdain | F01D 11/18 415/116 |
| 6,270,311 B1 * | 8/2001 | Kuwabara | F01D 11/005 415/110 |
| 6,758,653 B2 * | 7/2004 | Morrison | F01D 9/04 415/116 |
| 6,893,214 B2 | 5/2005 | Alford et al. | |
| 6,893,215 B2 * | 5/2005 | Kuwabara | F01D 11/005 415/115 |
| 6,910,854 B2 * | 6/2005 | Joslin | F01D 5/225 415/139 |

(Continued)

*Primary Examiner* — Richard A Edgar
(74) *Attorney, Agent, or Firm* — Barnes & Thornburg LLP (57) ABSTRACT

A turbine shroud for a gas turbine engine is disclosed in this paper. The turbine shroud includes a ceramic-matrix composite blade track. The ceramic-matrix composite blade track includes a plurality of track segments located circumferentially adjacent to one another to form a track ring. Features of the track segments provide tortuous paths for gasses trying to pass through the ceramic-matrix composite blade track that may reduce leakage through the blade track.

18 Claims, 4 Drawing Sheets

(56) References Cited

U.S. PATENT DOCUMENTS

| | | | |
|---|---|---|---|
| 7,052,235 B2* | 5/2006 | Alford | F01D 9/04 |
| | | | 415/173.1 |
| 7,334,985 B2 | 2/2008 | Lutjen et al. | |
| 7,600,967 B2* | 10/2009 | Pezzetti, Jr. | F01D 11/005 |
| | | | 415/115 |
| 7,726,936 B2 | 6/2010 | Keller et al. | |
| 8,287,234 B1 | 10/2012 | Liang | |
| 8,714,491 B2 | 5/2014 | Simon et al. | |
| 8,790,067 B2 | 7/2014 | McCaffrey et al. | |
| 8,944,756 B2* | 2/2015 | Lagueux | F01D 11/22 |
| | | | 415/113 |
| 9,079,245 B2* | 7/2015 | Durocher | F01D 9/02 |
| 2002/0189183 A1 | 12/2002 | Ricciardelli | |
| 2006/0249912 A1* | 11/2006 | Wilson, Jr. | F16J 15/442 |
| | | | 277/409 |
| 2009/0155054 A1 | 6/2009 | Rathmann | |
| 2010/0068063 A1* | 3/2010 | Berg | F01D 5/3007 |
| | | | 416/223 A |
| 2012/0156029 A1 | 6/2012 | Karafillis et al. | |
| 2017/0159480 A1* | 6/2017 | Dev | F01D 11/006 |

\* cited by examiner

SEGMENTED TURBINE SHROUD WITH SEALING FEATURES

CROSS REFERENCE TO RELATED APPLICATIONS

This application claims priority to and the benefit of U.S. Provisional Patent Application No. 62/118,802, filed 20 Feb. 2015, the disclosure of which is now expressly incorporated herein by reference.

FIELD OF THE DISCLOSURE

The present disclosure relates generally to gas turbine engines, and more specifically to turbine assemblies used in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors and turbines typically include alternating stages of static vane assemblies and rotating wheel assemblies that perform work on or extract work from gasses moving through a primary gas path of the engine. The rotating wheel assemblies include disks carrying blades around their outer edges. When the rotating wheel assemblies turn, tips of the blades move along blade tracks included in static shrouds that are arranged around the rotating wheel assemblies. Such static shrouds are adapted to reduce the leakage of gas over the blades without interaction with the blades. The static shrouds may also be designed to minimize leakage of gas into or out of the primary gas path.

SUMMARY

The present disclosure may comprise one or more of the following features and combinations thereof.

According to one aspect of the present disclosure, a turbine shroud for a gas turbine engine may include a metallic carrier and a ceramic-matrix composite blade track coupled to the metallic carrier. The metallic carrier may be adapted to be coupled to a turbine case. The metallic carrier may include a plurality of carrier segments located circumferentially adjacent to one another to form a carrier ring around a central axis with carrier segment gaps circumferentially between adjacent carrier segments. The ceramic-matrix composite blade track may include a plurality of track segments located circumferentially adjacent to one another to form a track ring around the central axis with track segment gaps circumferentially between adjacent track segments.

In illustrative embodiments, the carrier segment gaps are circumferentially spaced apart from the track segment gaps so that a tortuous gas path radially through the carrier segment gaps of the metallic carrier and the track gaps of the ceramic-matrix composite blade track is formed.

In illustrative embodiments, the turbine shroud may include a plurality of strip seal elements. The strip seal elements may extend circumferentially across carrier gaps radially outward of the track segment gaps between carrier segments. The turbine shroud may be free of strip seals that extend across track gaps between track segments.

In illustrative embodiments, each track segment may have a first circumferential end, a second circumferential end, and a central section interconnecting the first circumferential end and the second circumferential end. The first circumferential end may cooperate with the second circumferential end to form a tortuous gas path extending radially away from the central axis through track gaps between circumferentially adjacent track segments.

In illustrative embodiments, the first circumferential end may have a non-linear shape when viewed axially along the central axis. The second circumferential end may have a non-linear shape complementary to the first circumferential end when viewed axially along the central axis.

In illustrative embodiments, the first circumferential end of each track segment may form a radially-inner surface of the ceramic-matrix composite blade track and may overlap the second circumferential end of a circumferentially adjacent track segment. In some embodiments, the second circumferential end of each track segment may form a radially-outer surface of the ceramic-matrix composite blade track and may overlap the first circumferential end of a circumferentially adjacent track segment.

In illustrative embodiments, each track segment may have a first circumferential end, a second circumferential end, and a central section interconnecting the first circumferential end and the second circumferential end. The first circumferential end may cooperate with the second circumferential end to form a tortuous gas path extending axially along the central axis through track gaps between circumferentially adjacent track segments.

In illustrative embodiments, the first circumferential end may have a non-linear shape when viewed radially outward away from the central axis. The second circumferential end may have a non-linear shape complementary to the first circumferential end when viewed radially outward away from the central axis.

In illustrative embodiments, the first circumferential end may have a non-linear shape when viewed axially along the central axis and the second circumferential end may have a non-linear shape complementary to the first circumferential end when viewed axially along the central axis. Further, the first circumferential end may cooperate with the second circumferential end to form a tortuous gas path extending radially away from the central axis through track gaps between circumferentially adjacent track segments.

In illustrative embodiments, the first circumferential end of each track segment may form an axially-forward surface of the ceramic-matrix composite blade track. In some embodiments, the second circumferential end of each track segment may form an axially-aft surface of the ceramic-matrix composite blade track.

According to another aspect of the present disclosure, a blade track for use in a turbine shroud of a gas turbine engine may include a plurality of track segments. The plurality of track segments may comprise ceramic-matrix composite materials and may be located circumferentially adjacent to one another to form a track ring around a central axis with track segment gaps circumferentially between adjacent track segments.

In illustrative embodiments, each track segment may have a first circumferential end, a second circumferential end, and a central section interconnecting the first circumferential end and the second circumferential end. The first circumferential end may cooperate with the second circumferential end to form a tortuous gas path extending axially along the central axis through track gaps between circumferentially adjacent track segments.

In illustrative embodiments, the first circumferential end may have a non-linear shape when viewed radially outward away from the central axis. The second circumferential end may have a non-linear shape complementary to the first circumferential end when viewed radially outward away from the central axis.

In illustrative embodiments, the first circumferential end may have a non-linear shape when viewed axially along the central axis and the second circumferential end may have a non-linear shape complementary to the first circumferential end when viewed axially along the central axis. Further, the first circumferential end may cooperate with the second circumferential end to form a tortuous gas path extending radially away from the central axis through track gaps between circumferentially adjacent track segments.

In illustrative embodiments, the first circumferential end of each track segment may form an axially-forward surface of the ceramic-matrix composite blade track. In some embodiments, the second circumferential end of each track segment may form an axially-aft surface of the ceramic-matrix composite blade track.

According to another aspect of the present disclosure, a blade track for use in a turbine shroud for a gas turbine engine may include a plurality of track segments comprising ceramic-matrix composite materials. The plurality of track segments may be located circumferentially adjacent to one another to form a track ring around a central axis with track segment gaps circumferentially between adjacent track segments.

In illustrative embodiments, each track segment may have a first circumferential end, a second circumferential end, and a central section interconnecting the first circumferential end and the second circumferential end. The first circumferential end may cooperate with the second circumferential end to form a tortuous gas path extending radially away from the central axis through track gaps between circumferentially adjacent track segments.

In illustrative embodiments, the first circumferential end may have a non-linear shape when viewed axially along the central axis. The second circumferential end may have a non-linear shape complementary to the first circumferential end when viewed axially along the central axis.

In illustrative embodiments, the first circumferential end of each track segment may form a radially-inner surface of the ceramic-matrix composite blade track and may overlap the second circumferential end of a circumferentially adjacent track segment. In some embodiments, the second circumferential end of each track segment may form a radially-outer surface of the ceramic-matrix composite blade track and may overlap the first circumferential end of a circumferentially adjacent track segment.

According to another aspect of the present disclosure, a gas turbine engine assembly may include a metallic carrier and a ceramic-matrix composite ring coupled to the metallic carrier. The metallic carrier may include a plurality of carrier segments located circumferentially adjacent to one another to form a carrier ring around a central axis with carrier segment gaps circumferentially between adjacent carrier segments. The ceramic-matrix composite ring may include a plurality of ring segments located circumferentially adjacent to one another around the central axis with ring segment gaps circumferentially between adjacent ring segments.

In illustrative embodiments, the carrier segment gaps may be circumferentially spaced apart from the ring segment gaps so that a tortuous gas path radially through the carrier segment gaps of the metallic carrier and the ring gaps of the ceramic-matrix composite ring is formed.

According to another aspect of the present disclosure, a gas turbine engine assembly may include a plurality of segments comprising ceramic-matrix composite materials. The plurality of segments may be located circumferentially adjacent to one another to form a ring around a central axis with segment gaps circumferentially between adjacent segments.

In illustrative embodiments, each segment may have a first circumferential end, a second circumferential end, and a central section interconnecting the first circumferential end and the second circumferential end. The first circumferential end may cooperate with the second circumferential end to form a tortuous gas path extending axially along the central axis through gaps between circumferentially adjacent segment.

According to another aspect of the present disclosure, a gas turbine engine assembly may include a plurality of segments comprising ceramic-matrix composite materials. The plurality of segments may be located circumferentially adjacent to one another to form a ring around a central axis with segment gaps circumferentially between adjacent segments.

In illustrative embodiments, each segment may have a first circumferential end, a second circumferential end, and a central section interconnecting the first circumferential end and the second circumferential end. The first circumferential end may cooperate with the second circumferential end to form a tortuous gas path extending radially away from the central axis through gaps between circumferentially adjacent segments.

These and other features of the present disclosure will become more apparent from the following description of the illustrative embodiments.

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

Figure 1:
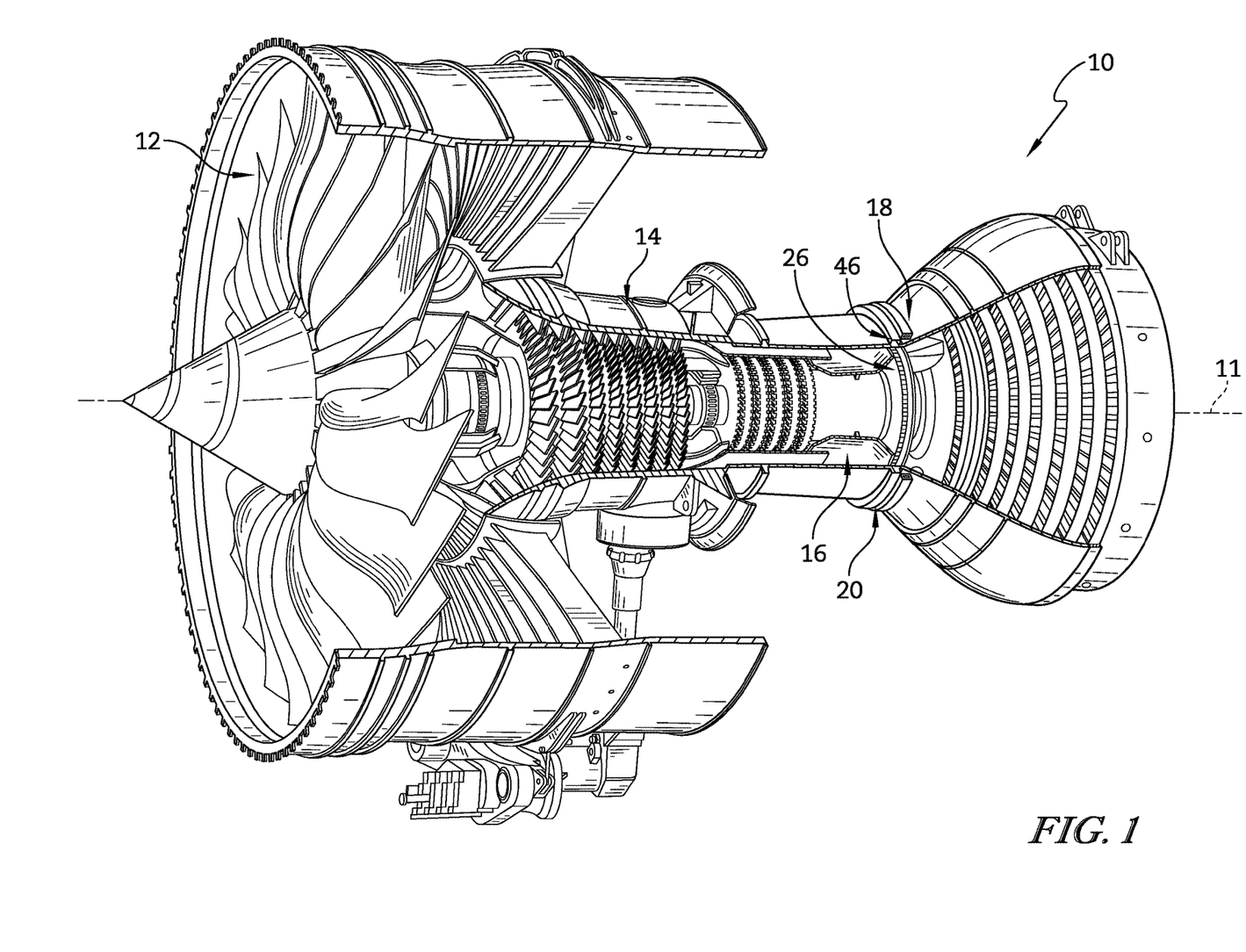
FIG. 1 is perspective view of a gas turbine engine cut away to show that the engine includes a fan, a compressor, a combustor, and a turbine.

FIG. 1 is an illustrative aerospace gas turbine engine 10 cut-away to show that the engine 10 includes a fan 12, a compressor 14, a combustor 16, and a turbine 18. The fan 12 is rotated about a central axis 11 of the engine 10 to provide thrust for an air vehicle. The compressor 14 compresses and delivers air to the combustor 16. The combustor 16 mixes fuel with the compressed air received from the compressor 14 and ignites the fuel. The hot high pressure products of the combustion reaction in the combustor 16 are directed into the turbine 18 and the turbine 18 extracts work to drive the compressor 14 and the fan 12.

Figure 2:
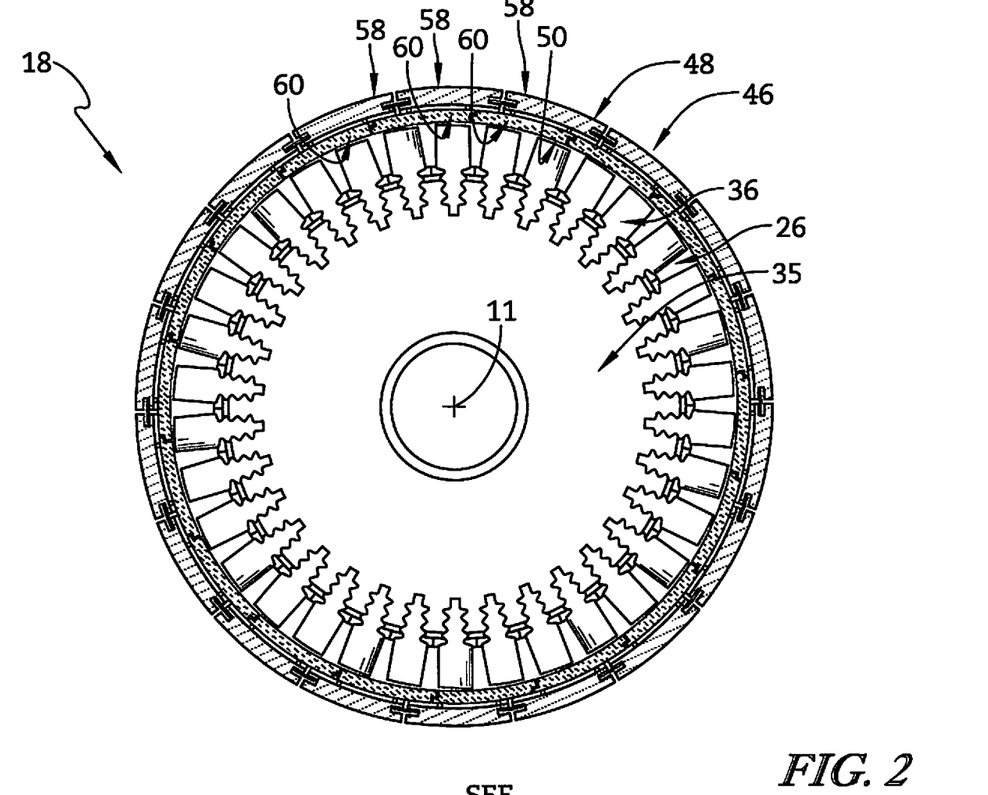
FIG. 2 is an axially-looking cross-sectional view of one turbine stage included in the turbine of the engine shown in FIG. 1 showing that the turbine stage includes a turbine wheel assembly and a turbine shroud that extends around the turbine wheel.

The turbine 18 illustratively includes a turbine wheel assembly 26 and a turbine shroud 46 as shown in FIGS. 1 and 2. The turbine wheel assembly 26 includes a plurality of blades 36 that extend out from a turbine disk 35. The blades 36 are pushed by the combustion products to cause the turbine wheel assembly 26 to rotate; thereby, driving the rotating components of the compressor 14 and/or the fan 12.

The turbine shroud 46, shown in FIG. 2, extends around the turbine wheel assembly 26 and is configured to block most combustion products from passing over the blades 36 without pushing the blades 36 to rotate. Combustion products that are allowed to pass over the blades 36 do not push the blades 36 and such passed-over products contribute to lost performance within the gas turbine engine 10.

Figure 3:
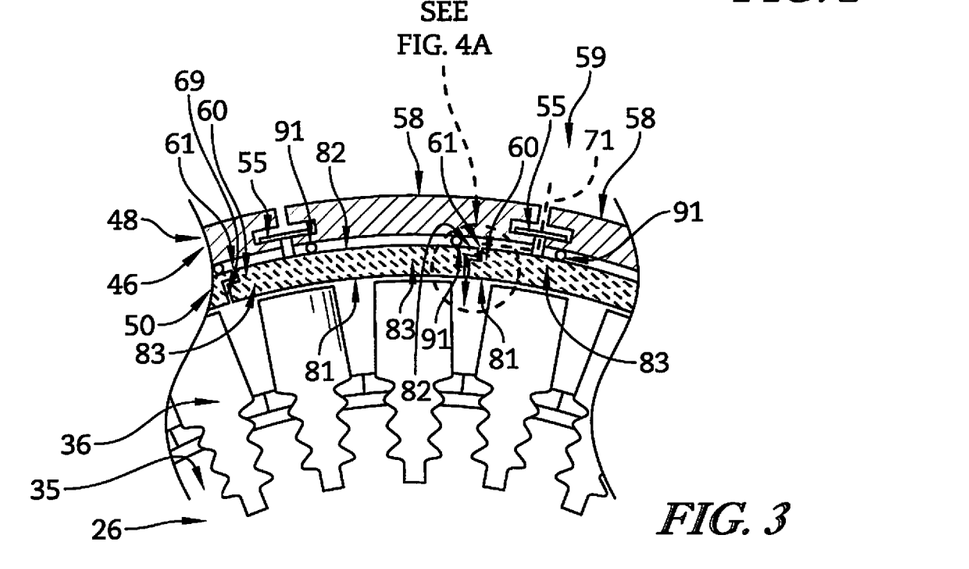
FIG. 3 is a detail view of a portion of FIG. 2 showing that the turbine shroud includes a metallic carrier and a ceramic-matrix composite blade track and showing that carrier gaps between carrier segments are circumferentially offset from track gaps between track segments to form a tortuous path for gasses trying to move radially through the turbine shroud.

The turbine shroud 46 illustratively includes a carrier 48 and a blade track (sometimes called seal ring) 50 as shown in FIGS. 2 and 3. The carrier 48 is configured to be coupled between and support the blade track 50 relative to a turbine case 20 in a selected position adjacent to the blades 36 of the turbine wheel assembly 26. The illustrative blade track 50 is nominally concentric with and nested into the carrier 48 along a rotational axis 11 of the engine 10. Slight differences in concentricity may be included into the design to account for differences in thermal expansion between the metal carrier 48 and ceramic blade track 50.

The carrier 48 is illustratively made from a metallic material such as, for example, a nickel-based or cobalt-based super alloy designed for use in high temperature environments as suggested in FIGS. 2 and 3. The carrier 48 illustrated includes a plurality of carrier segments 58 located circumferentially adjacent to one another to form a carrier ring around the central engine axis 11. Carrier segment gaps 59 are formed circumferentially between adjacent carrier segments 58 as shown in FIGS. 2 and 3. In some embodiments, the carrier 48 may be a one-piece, fully-annular component without carrier segment gaps 59.

The blade track 50 is illustratively made from ceramic-matrix composite materials, such as, for example silicon-carbide reinforcements suspended in silicon-carbide matrix as suggested in FIGS. 2 and 3. In other embodiments, the blade track 50 may be made from other ceramic-containing materials or from metallic materials. The blade track 50 is coupled to the metallic carrier and includes a plurality of track segments 60 located circumferentially adjacent to one another to form a track ring around the central axis 11. Track segment gaps 69 are illustratively formed circumferentially between adjacent track segments 60.

In the illustrative embodiment, the carrier segment gaps 59 are circumferentially offset or spaced apart from the track segment gaps 69 so that a tortuous gas path 71 is formed radially through the carrier segment gaps 59 of the carrier 48 and the track gaps 69 of the blade track 50 as shown in FIG. 3. Tortuous path 71 provides a sealing feature that may reduce the leakage of cooling air present radially outward of the blade track 50 radially inward into the hot, high-pressure combustion products being used push the turbine blades 36 during operation of the gas turbine engine 10. Such a reduction in leakage may improve the efficiency of the engine 10.

A plurality of strip seal elements 55 extend circumferentially across the carrier gaps 59 between carrier segments 58 as shown in FIG. 3. The strip seals 55 are located radially outward of the track segment gaps 69 such that the turbine shroud 46 is free of strip seals that extend across track gaps 69 between track segments 60. This arrangement eliminates the need for strip seal slots to be formed in the ceramic-matrix composite containing track segments 60.

Standard design strip seals used in metallic components can create challenges when incorporated into ceramic-containing composite hardware, like the track segments 60, related to the anisotropic behavior of some composite materials. The interlaminar (normal to ply/tows) capabilities of ceramic-containing composites can be lower than the in plane capabilities of the material. Therefore, strip seal grooves in ceramic-containing composites can create a stress riser in the interlaminar direction.

In some designs, strip seal grooves may be small in terms of groove width but can be large in terms of their depth into the part. The groove surfaces may be difficult to coat if desired. Such coating of machined and exposed surfaces of the ceramic-containing composite material may prevent recession and oxidation of the ceramic-containing fibers in some designs. Accordingly, strip seals may be moved away from the ceramic-containing flow path and into metallic support structure. This location of the strip seal can create additional area for leakage over the blade tips. However, tortuous sealing features are contemplated and described herein to counteract such leakage. These features may also be beneficial in designs using metallic components.

Figure 4:
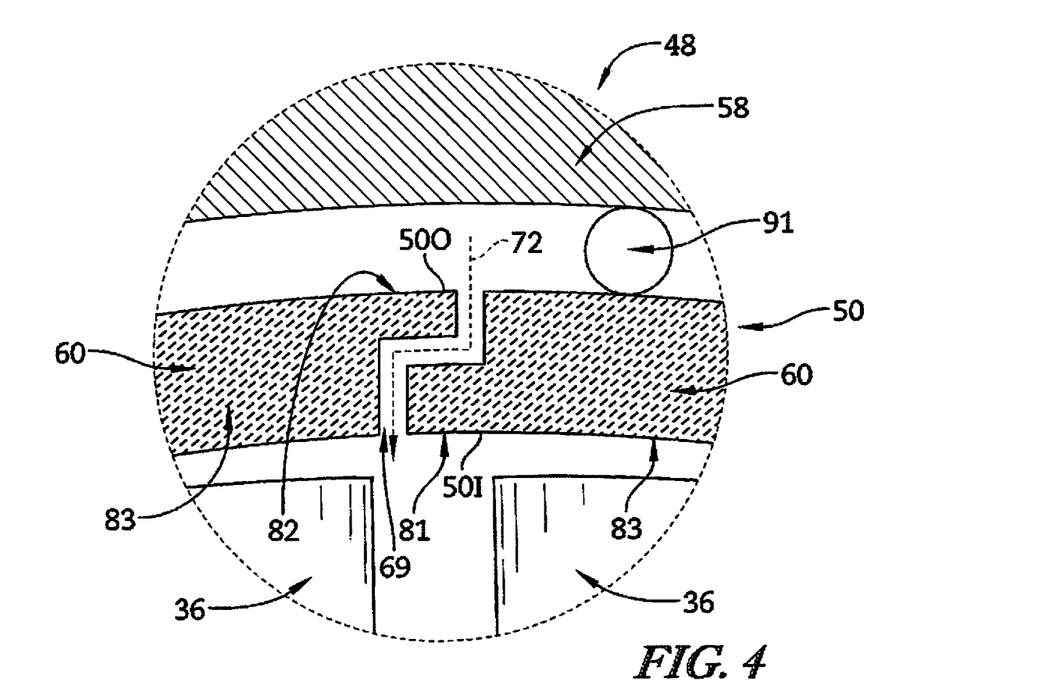
FIG. 4 is a detail view of a portion of FIG. 3 showing that complementary, non-linear ends of adjacent track segments cooperate in a simple overlapping arrangement to form a tortuous path for gasses trying to move radially through the blade track of the turbine shroud.

Referring to FIG. 3, each track segment 60 has a first circumferential end 81, a second circumferential end 82, and a central section 83 interconnecting the first circumferential end 81 and the second circumferential end 82. In the illustrative embodiment, the first circumferential end 81 cooperates with the second circumferential end 82 of a circumferentially adjacent track segment 60 to form a tortuous gas path 72 extending radially away from the central axis 11 through track gaps 69 as shown in FIG. 4. Tortuous path 72 provides a sealing feature that may reduce the leakage of cooling air from radially outward of the blade track 50 inward into the hot, high-pressure combustion products being used push the turbine blades 36 during operation of the gas turbine engine 10. Such a reduction in leakage may improve the efficiency of the engine 10.

The first circumferential end 81 of each track segment 60 has a non-linear shape when viewed axially along the central axis 11 and the second circumferential end 82 has a non-linear shape complementary to the first circumferential end 81 when viewed axially along the central axis 11 as shown in FIG. 4. In the illustrative embodiment, a simple overlapping arrangement of the first circumferential end 81 and the second circumferential end 82 of adjacent track segments 60 when viewed along the central axis 11 provide the radially tortuous path 72.

In the illustrative embodiment, the first circumferential end 81 of each track segment 60 forms a radially-inner surface 50I of the blade track 50 and overlaps the second circumferential end 82 of a circumferentially adjacent track segment 60. The second circumferential end 82 of each track segment 60 forms a radially-outer surface 50O of the blade track 50 and overlaps the first circumferential end 81 of a circumferentially adjacent track segment 60. While only one step is shown in the illustrated ends 81, 82, any number of steps may be used to create the tortuous path 72.

Other circumferential end shapes adapted to form a radial tortuous path are contemplated herein. In other embodiments, an arcuate arrangement, a sinusoidal wave arrangement, or any other non-linear arrangement may provide a radially tortuous path between track gaps of a blade track.

Figure 4A:
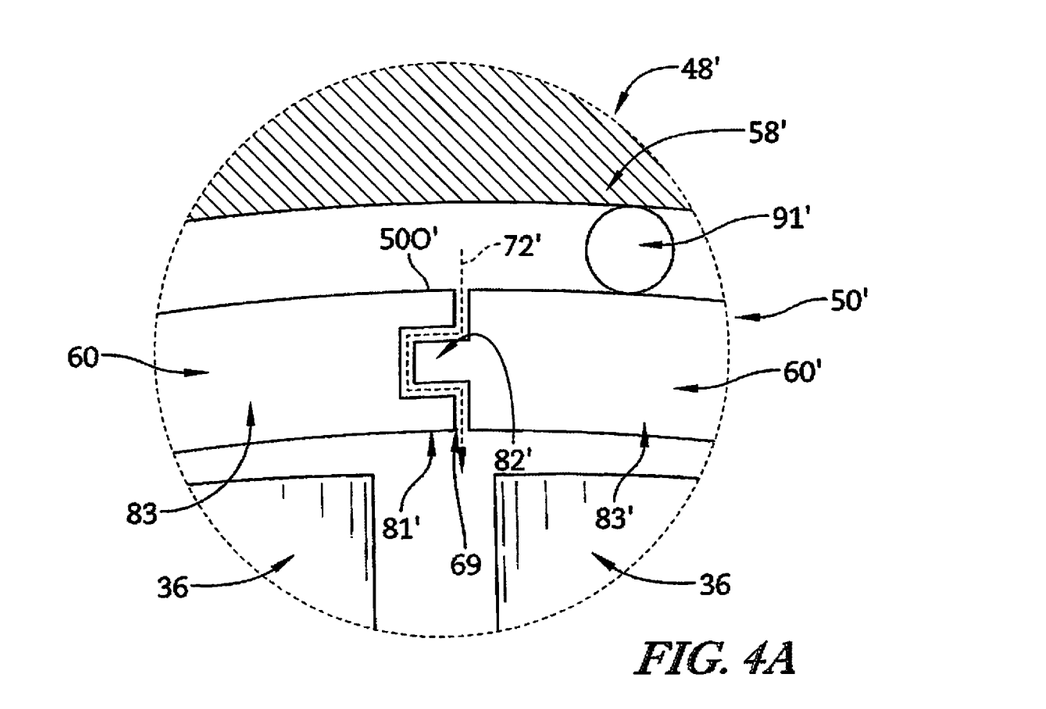
FIG. 4A is a view similar to FIG. 4 of an alternative blade track embodiment showing that complementary, non-linear ends of adjacent track segments cooperate in a tongue-ingroove arrangement to form a tortuous path for gasses trying to move radially through the alternative blade track.

In one example, an alternative embodiment of a blade track 50' incorporates a tongue-in-groove arrangement as shown in FIG. 4A. The alternative embodiment is substantially similar to the embodiment shown in FIGS. 1-4 and described herein. Accordingly, similar reference numbers in the prime (') series indicate features that are common between the embodiments. The description of the embodiment shown in FIGS. 1-4 is hereby incorporated by reference to apply to the alternative embodiment shown in FIG. 4A, except in instances when it conflicts with the specific description and drawings thereof.

In the alternative embodiment of FIG. 4A, the first circumferential end 81' and the second circumferential end 82' of adjacent track segments 60' provide a tortuous path 72' that moves radially through the blade track 50'. Generally, in the alternative embodiment of FIG. 4A, the first circumferential end 81' has a non-linear shape when viewed axially along the central axis and the second circumferential end 82' has a non-linear shape complementary to the first circumferential end 81' when viewed axially along the central axis. To provide the tongue-in-groove, the first circumferential end 81' of each track segment 60' forms a radially inward surface 50I' and the radially outer surface 50O' while the second circumferential end 82' of each track segment 60' extends radially between portions of the first circumferential end 81' of an adjacent track segment 60'.

Figure 5:
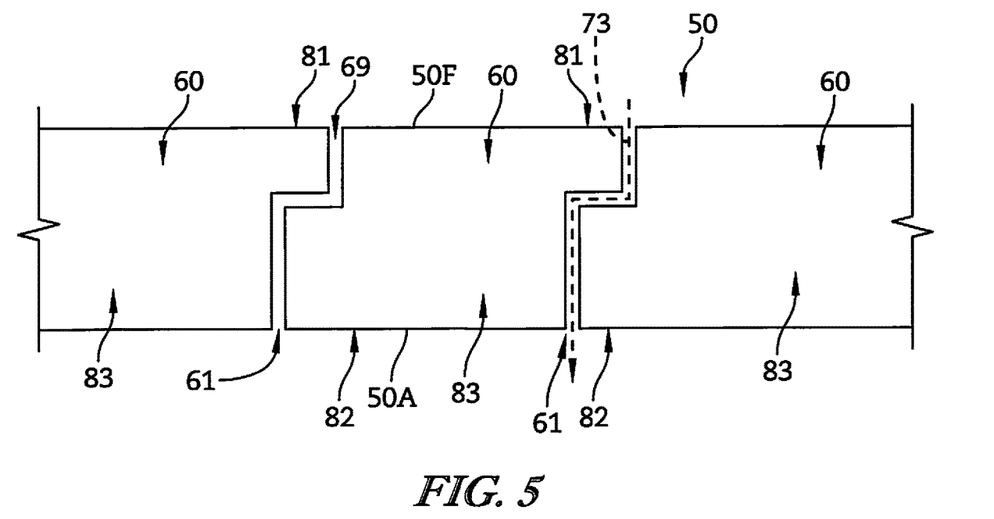
FIG. 5 is a view of the blade track of FIGS. 2-4 looking radially outward from a central engine axis showing that complementary, non-linear ends of adjacent track segments cooperate in a simple overlapping arrangement to form a tortuous path for gasses trying to move axially through the blade track.

Referring now to FIG. 5, it is shown that the first circumferential end 81 of each track segment 60 cooperates with the second circumferential end 82 of an adjacent track segment 60 to form a tortuous gas path 73 extending axially along the central axis 11 through track gaps 69 between circumferentially adjacent track segments 60. Tortuous path 73 provides a sealing feature that may reduce the leakage of hot, high-pressure combustion products axially through the blade track 50 during operation of the gas turbine engine 10. Such a reduction in leakage may improve the efficiency of the engine 10.

In the illustrative embodiment, a simple overlapping arrangement of the first circumferential end 81 and the second circumferential end 82 of adjacent track segments 60 when outward away from the central axis 11 provides the tortuous path 73 as shown in FIG. 5. While only one step is shown in the illustrated ends 81, 82, any number of steps may be used to create the tortuous path 73.

In the illustrative embodiment, the first circumferential end 81 of each track segment 60 forms an axially forward surface 50F of the blade track 50 and overlaps the second circumferential end 82 of a circumferentially adjacent track segment 60. The second circumferential end 82 of each track segment 60 forms an axially aft surface 50A of the blade track 50 and overlaps the first circumferential end 81 of a circumferentially adjacent track segment 60.

Other circumferential end shapes adapted to form an axially tortuous path are contemplated herein. In other embodiments, an arcuate arrangement, a sinusoidal wave arrangement, or any other non-linear arrangement may provide an axially tortious path between track gaps of a blade track.

Figure 5A:
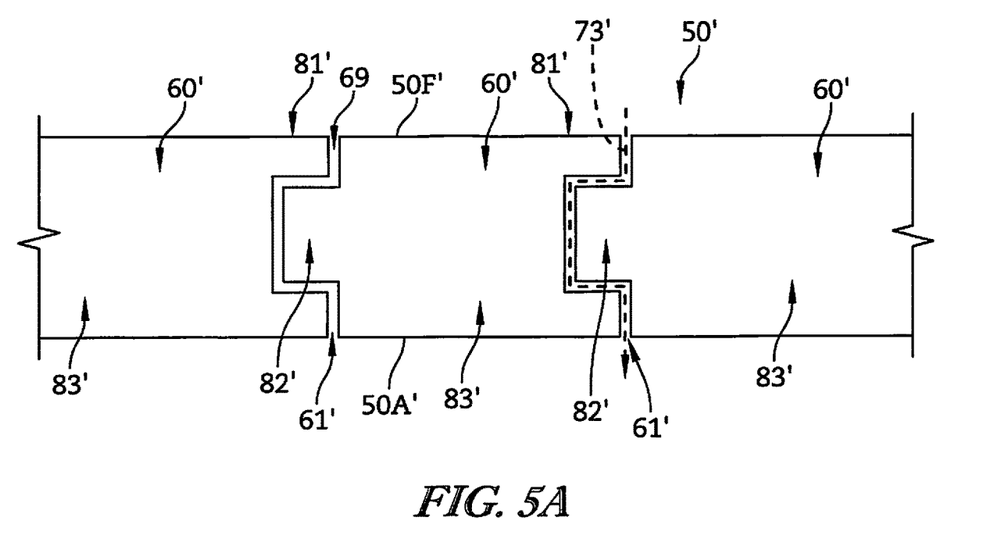
FIG. 5A is a view similar to FIG. 5 of an alternative blade track embodiment showing that complementary, non-linear ends of adjacent track segments cooperate in a tongue-in-groove arrangement to form a tortuous path for gasses trying to move axially through the blade track.

In one example, an alternative embodiment of a blade track 50' incorporates a tongue-in-groove arrangement as shown in FIG. 5A. The alternative embodiment is substantially similar to the embodiment shown in FIGS. 1-4 and 5 described herein. Accordingly, similar reference numbers in the prime (') series indicate features that are common between the embodiments. The description of the embodiment shown in FIGS. 1-4 and 5 is hereby incorporated by reference to apply to the alternative embodiment shown in FIG. 5A, except in instances when it conflicts with the specific description and drawings thereof.

In the alternative embodiment of FIG. 5A, the first circumferential end 81' and the second circumferential end 82' of adjacent track segments 60' provide a tortuous path 73' that moves axially through the blade track 50'. Generally, in the alternative embodiment of FIG. 4A, the first circumferential end 81' has a non-linear shape when viewed axially along the central axis and the second circumferential end 82' has a non-linear shape complementary to the first circumferential end 81' when viewed axially along the central axis. To provide the tongue-in-groove, the first circumferential end 81' of each track segment 60' forms an axially forward surface 50f' and an axially aft surface 50A' while the second circumferential end 82' of each track segment 60' extends axially between portions of the first circumferential end 81' of an adjacent track segment 60'.

In the illustrative embodiment, the turbine shroud 46 also includes a plurality of rope seals 91 as shown in FIGS. 3 and 4. The rope seals 91 extend axially along the axis 11 and are located radially between the carrier 48 and the blade track 50. The rope seals 91 are adapted to block air from moving circumferentially around the blade track 50 during operation of the engine 10.

It is contemplated that the tortuous sealing features of the illustrative embodiments may be incorporated individually or in various combinations. Alone or in combination, the tortuous sealing features of the present disclosure may provide benefits to turbine efficiency as well as reductions in cooling air leakage into the primary gas path while preventing hot gas leakage out of the primary gas path.

It is also contemplated that the tortuous sealing features of the illustrative embodiment may be incorporated into other assemblies within a gas turbine engine. For example, such features may be used to provide sealing along and through the ceramic-containing composite combustor liners mounted to a metallic combustor carrier. Accordingly, the present disclosure is not limited to turbine shroud designs but is applicable to any composite and metallic assembly.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine shroud for a gas turbine engine, the turbine shroud comprising
a metallic carrier adapted to be coupled to a turbine case, the metallic carrier including a plurality of carrier segments located circumferentially adjacent to one another to form a carrier ring around a central axis with carrier segment gaps circumferentially between adjacent carrier segments, and
a ceramic-matrix composite blade track coupled to the metallic carrier, the ceramic-matrix composite blade track including a plurality of ceramic-matrix composite track segments located circumferentially adjacent to one another to form a track ring around the central axis with track segment gaps circumferentially between adjacent ceramic-matrix composite track segments, each of the plurality of ceramic-matrix composite track segments having a first circumferential end, a second circumferential end, and a central section interconnecting the first circumferential end and the second circumferential end, the first circumferential end of one track segment cooperating with the second circumferential end of an adjacent track segment to define a gap forming a tortuous track gas path for gases moving radially through the ceramic-matrix composite blade track, the tortuous track gas path extends radially away from the central axis through track gaps between circumferentially adjacent track segments,
wherein the carrier segment gaps are circumferentially spaced apart from the track segment gaps to define a tortuous carrier gas path radially through the carrier segment gaps of the metallic carrier and a circumferential section is defined radially between the ceramic-matrix composite blade track and the metallic carrier in flow communication with the tortuous track gas path and the tortuous carrier gas path.

2. The turbine shroud of claim 1, further comprising a plurality of strip seal elements that extend circumferentially across the carrier segment gaps radially outward of the track segment gaps between carrier segments.

3. The turbine shroud of claim 1, wherein the first circumferential end has a non-linear shape when viewed axially along the central axis and the second circumferential end has a non-linear shape complementary to the first circumferential end when viewed axially along the central axis.

4. The turbine shroud of claim 1, wherein the first circumferential end of each track segment forms a radially-inner surface of the ceramic-matrix composite blade track and overlaps the second circumferential end of a circumferentially adjacent track segment.

5. The turbine shroud of claim 4, wherein the second circumferential end of each track segment forms a radially-outer surface of the ceramic-matrix composite blade track and overlaps the first circumferential end of a circumferentially adjacent track segment.

6. The turbine shroud of claim 1, wherein the first circumferential end has a non-linear shape when viewed radially outward away from the central axis and the second circumferential end has a non-linear shape complementary to the first circumferential end when viewed radially outward away from the central axis.

7. The turbine shroud of claim 6, wherein the first circumferential end has a non-linear shape when viewed axially along the central axis and the second circumferential end has a non-linear shape complementary to the first circumferential end when viewed axially along the central axis.

8. The turbine shroud of claim 1, wherein the first circumferential end of each track segment forms an axially-forward surface of the ceramic-matrix composite blade track.

9. The turbine shroud of claim 8, wherein the second circumferential end of each track segment forms an axially-aft surface of the ceramic-matrix composite blade track.

10. A ceramic-matrix composite blade track for use in a turbine shroud of a gas turbine engine including a metallic carrier adapted to be coupled to a turbine case, the metallic carrier including a plurality of carrier segments located circumferentially adjacent to one another to form a carrier ring around a central axis with carrier segment gaps circumferentially between adjacent carrier segments, the blade track comprising
a plurality of ceramic-matrix composite track segments comprising ceramic-matrix composite materials, the plurality of ceramic-matrix composite track segments located circumferentially adjacent to one another to form a track ring around a central axis with track segment gaps circumferentially between adjacent ceramic-matrix composite track segments,
wherein each ceramic-matrix composite track segment has a first circumferential end, a second circumferential end, and a central section interconnecting the first circumferential end and the second circumferential end, the first circumferential end cooperates with the second circumferential end of an adjacent ceramic-matrix composite track segment to define a C-shaped groove sized to receive a corresponding tongue of the adjacent ceramic-matrix composite track segment, and the first circumferential end cooperates with the second circumferential end of the adjacent ceramic-matrix composite track segment to form a tortuous gas path for gases moving radially through the ceramic-matrix composite blade track, the tortuous gas path extending radially away from the central axis through track gaps between circumferentially adjacent ceramic-matrix composite track segments, wherein the tortuous gas path is a through flow path communicating between an inner and outer surface of the ceramic-matrix composite track segments,
wherein the track segment gaps are arranged circumferentially spaced apart from the carrier segment gaps to define a tortuous carrier gas path radially through the carrier segment gaps and a circumferential section is defined radially between the ceramic-matrix composite blade track segments and the metallic carrier in flow communication with the tortuous track gas path and the tortuous carrier gas path.

11. The blade track of claim 10, wherein the first circumferential end has a non-linear shape when viewed radially outward away from the central axis and the second circumferential end has a non-linear shape complementary to the first circumferential end when viewed radially outward away from the central axis.

12. The blade track of claim 11, wherein the first circumferential end has a non-linear shape when viewed axially along the central axis and the second circumferential end has a non-linear shape complementary to the first circumferential end when viewed axially along the central axis such that the first circumferential end cooperates with the second circumferential end to form the tortuous gas path extending radially away from the central axis through track gaps between circumferentially adjacent track segments.

13. The blade track of claim 10, wherein the first circumferential end of each track segment forms an axially-forward surface of the ceramic-matrix composite blade track.

14. The blade track of claim 13, wherein the first circumferential end of each track segment forms an axially-aft surface of the ceramic-matrix composite blade track.

15. A ceramic-matrix composite blade track for use in a turbine shroud for a gas turbine engine, the turbine shroud including a metallic carrier adapted to be coupled to a turbine case, the metallic carrier including a plurality of carrier segments located circumferentially adjacent to one another to form a carrier ring around a central axis with carrier segment gaps circumferentially between adjacent carrier segments, the blade track comprising a plurality of ceramic-matrix composite track segments comprising ceramic-matrix composite materials, the plurality of ceramic-matrix composite track segments located circumferentially adjacent to one another to form a track ring around a central axis with track segment gaps circumferentially between adjacent ceramic-matrix composite track segments, wherein each ceramic-matrix composite track segment has a first circumferential end, a second circumferential end, and a central section interconnecting the first circumferential end and the second circumferential end, the first circumferential end cooperates with the second circumferential end of an adjacent ceramic-matrix composite track segment to define a C-shaped groove sized to receive a corresponding tongue of the adjacent ceramic-matrix composite track segment, and the first circumferential end cooperates with the second circumferential end of the adjacent ceramic-matrix composite track segment to form a tortuous gas path for gases moving radially through the ceramic-matrix composite blade track, the tortuous gas path extending radially away from the central axis through track gaps between circumferentially adjacent ceramic-matrix composite track segments, wherein the tortuous gas path forms a through flow passage communicating between an inner and outer surface of the ceramic-matrix composite track segments, wherein the ceramic-matrix composite track segments are arranged to position the track segment gaps circumferentially spaced apart from the carrier segment gaps to define a tortuous carrier gas path radially through the carrier segment gaps and a circumferential section is defined radially between the ceramic-matrix composite blade track segments and the metallic carrier in flow communication with the tortuous track gas path and the tortuous carrier gas path.

16. The blade track of claim 15, wherein the first circumferential end has a non-linear shape when viewed axially along the central axis and the second circumferential end has a non-linear shape complementary to the first circumferential end when viewed axially along the central axis.

17. The blade track of claim 15, wherein the first circumferential end of each track segment forms a radially-inner surface of the ceramic-matrix composite blade track.

18. The blade track of claim 17, wherein the first circumferential end of each track segment forms a radially-outer surface of the ceramic-matrix composite blade track.

* * * * *